(No Model.)

F. MARQUART.
COOKING STOVE OR RANGE.

No. 422,310. Patented Feb. 25, 1890.

WITNESSES,
N. S. Armstutz
R. B. Moser

INVENTOR.
Fredrich Marquart.
By H. J. Fisher
ATTORNEY.

UNITED STATES PATENT OFFICE.

FREDRICH MARQUART, OF CLEVELAND, OHIO.

COOKING STOVE OR RANGE.

SPECIFICATION forming part of Letters Patent No. 422,310, dated February 25, 1890.

Application filed September 13, 1889. Serial No. 323,853. (No model.)

*To all whom it may concern:*

Be it known that I, FREDRICH MARQUART, a citizen of the United States, residing at Cleveland, in the county of Cuyahoga and State of Ohio, have invented certain new and useful Improvements in Cooking Stoves or Ranges; and I do hereby declare that the following is a full, clear, and exact description of the invention, which will enable others skilled in the art to which it appertains to make and use the same.

My invention relates to improvements in cooking stoves or ranges; and the invention consists in a cooking stove or range provided with a warming-oven having a door hinged horizontally along the edge of the oven and provided with a crank and tension-spring, so arranged that the spring will help to raise the door and hold it open, and when the door is shut also hold it closed, all as hereinafter fully described, and particularly pointed out in the claims.

Figure 1:
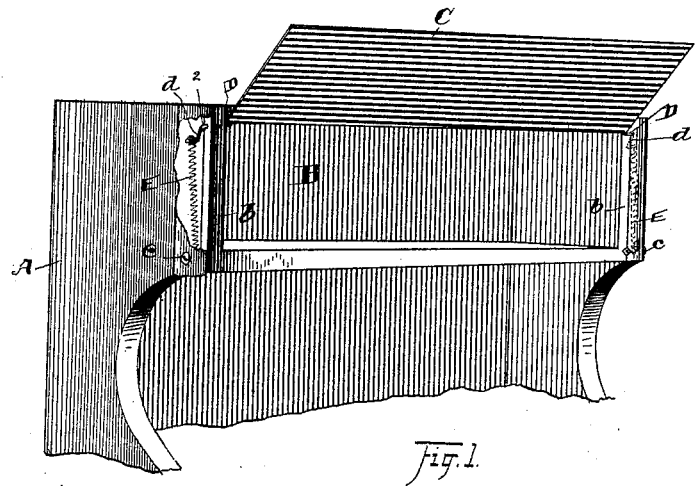
Figure 2:
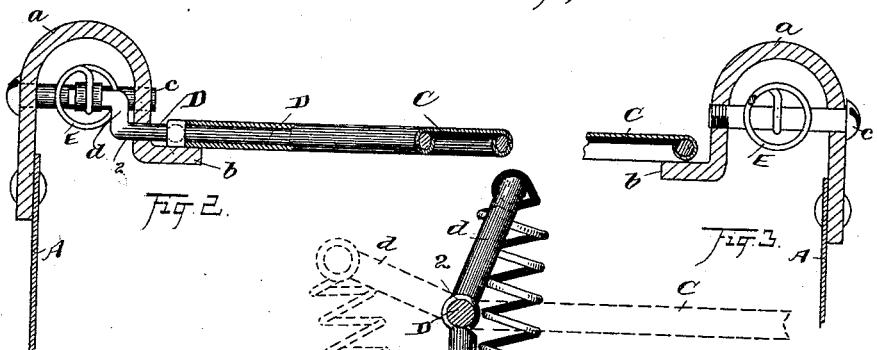
Figure 3:
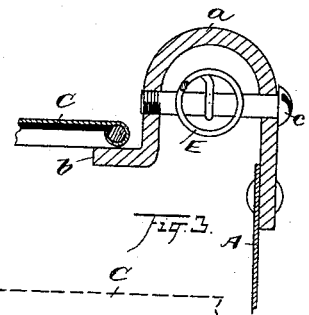
Figure 4:
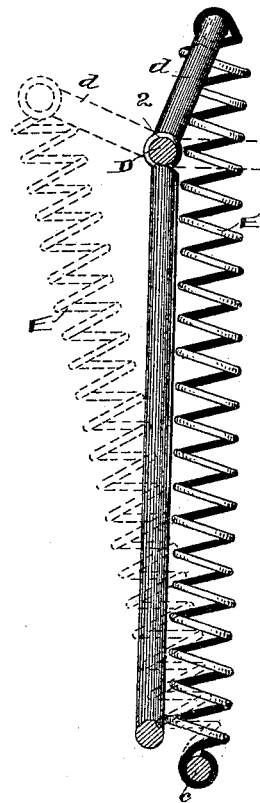

In the accompanying drawings, Figure 1 is a perspective view of an oven provided with my improved mechanism, the casing being broken away at the near edge to show the arrangement of the crank and spring. Fig. 2 is a cross-section of the casing at one side where the crank traverses the same, the construction being the same also at the other side or end and looking down on the spring and its bottom connection. Fig. 3 is a cross-section of the casing below where the spring terminates and showing the bolt by which it is secured. Fig. 4 is a side elevation, enlarged, of the spring alone, and showing in full lines its relation to the crank when the door is closed and in dotted lines its relation to the crank when the door is open.

A denotes the support and casing of the elevated or warming oven B, which rests, as usual, upon the rear portion of a cooking stove or range.

The oven B is provided with a door C, hinged along its upper edge and adapted to be raised and lowered by swinging up and down instead of laterally, as is the usual way. These laterally-swinging doors are liable to get in the way when open, and if the stove does not stand perfectly level will gravitate toward the lowest position, whatever it may be; but with my construction the door when open is absolutely out of the way, and it requires no exertion to swing it from one position to another.

In carrying out my invention the casing A is provided with an extension $a$ at either side of the opening to the oven and projecting beyond the face $b$ thereof to furnish housing for the tension mechanism by which the door is controlled. This extension is substantially U-shaped in cross-section and has the outline of a column, so as to contribute to appearance as well as utility. The door C is hinged by means of a rod D, having its ends extending into the projections $a$, where they are shown as bent into the form of a crank $d$. Obviously, to get the desired effect both ends would be bent relatively the same. The door C is so hung and fastened on the rod D that when it is closed the crank extremities $d$ will drop a short distance outside of a vertical plane and sufficiently by the aid of spring E to exert a closing pressure upon the door—for example, as illustrated in full lines, Fig. 4. In this figure the spring and arm $d$ are shown as having passed to the right of the pivotal center 2, which is the bearing of rod D in the oven-front. The tension of springs E is communicated to the door through the cranks $d$, and this pressure begins as soon as the crank $d$ passes across the vertical line to one side thereof. On the other hand, the tension of spring E is exerted to assist in opening and to hold open the door C when the cranks pass toward the opposite position, (shown in dotted lines, Fig. 4, and in full lines, Fig. 1,) and the door is hung on the rod D, so as to give the greater leverage to the cranks in holding the door in raised position, as obviously more exertion is required for this purpose than to keep it closed. In either case the projections $a$ afford room for this movement of cranks $d$ and the back-and-forth movement of spring E. The said spring is secured at the bottom of the projection $a$ by a suitable bolt $c$ and has the requisite strength to perform the function contemplated for it. Thus in Fig. 1 the door C is shown as held open in an upwardly-inclined position, giving free access to the oven and remaining in that position by reason of the pull of the springs E exerted through the cranks $d$. Then in closing the door the spring helps to relieve the weight until it passes the center vertically of its pivot, when the opposite effect is felt and the spring forces and keeps the door closed. The door requires no catch or lock to hold it shut, and its movement to either position is exceedingly easy and convenient.

The cranks $d$ might be formed in part with the oven-door, instead of being on a rod which is firmly fastened to the door along its upper edge, and the spring and crank might be on the outside of the oven-casing, thus dispensing with the forward extension $a$; but neither is desirable. Other modifications might be made; but the structure shown is about as I find most practicable and convenient.

In case the spring E be made strong or heavy enough, a single spring may be used instead of two springs, as hereinbefore described.

Having thus described my invention, what I claim as new, and desire to secure by Letters Patent, is—

1. In a stove or range, an oven-front having housing at its ends for crank and spring mechanism, in combination with a door provided with cranks at its pivot-point and springs located in said housing and connected with said cranks to swing to either side of the dead-center, and thus hold the door either open or closed, substantially as set forth.

2. In a stove or range, an oven-door provided with a crank-rod along its top rigid with the door and a spring secured to said rod at one end and to the oven-casing at the other, in combination with projecting housing on the oven-casing containing said spring, substantially as set forth.

3. In a stove or range, a warming-oven provided with housing $a$ at its ends extending forward of the door, in combination with a door having a crank-rod entering said housing through its side and springs in the housing connected with said cranks, as and for the purpose set forth.

4. The casing provided with the housings $a$ and the face $b$ between the housings, the crank-rod D, the door C, rigid with said crank-rod, and the springs E in the housings, connected at one end with the crank of rod D and at the other with bolts $c$, all in combination, substantially as set forth.

In testimony whereof I hereunto set my hand this 4th day of September, 1889.

FREDRICH MARQUART.

Witnesses:
H. T. FISHER,
I. L. COREY.